Nov. 29, 1966 N. A. BRUNS 3,288,698
ELECTRODE FOR ELECTROLYTIC CAVITY SINKING
Filed Sept. 13, 1962 2 Sheets-Sheet 1
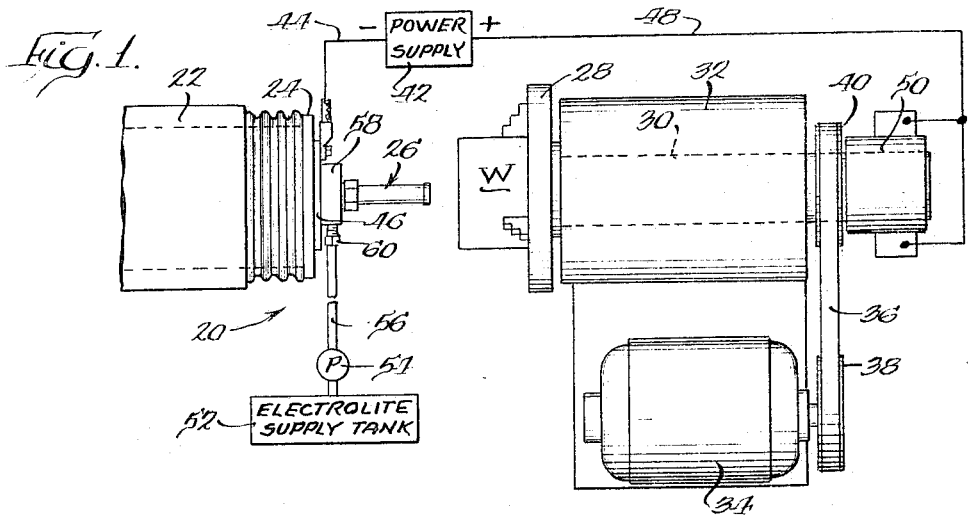
Fig. 1.
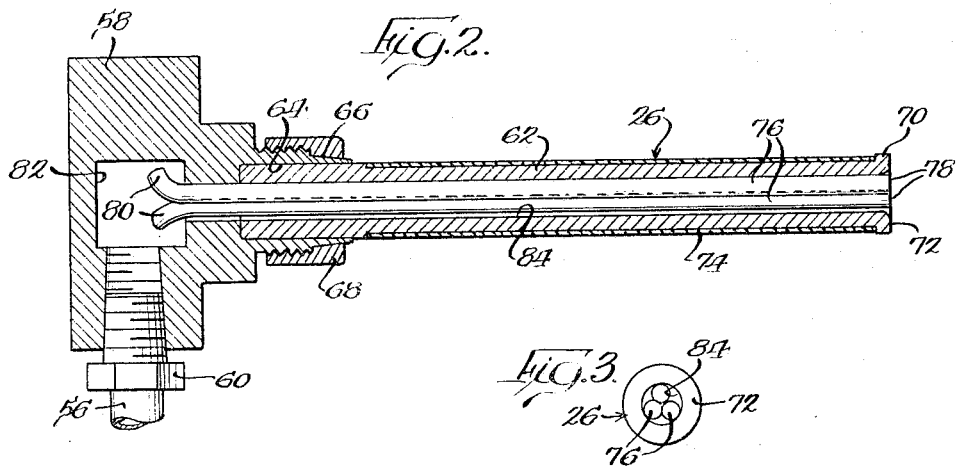
Fig. 2.
Fig. 3.
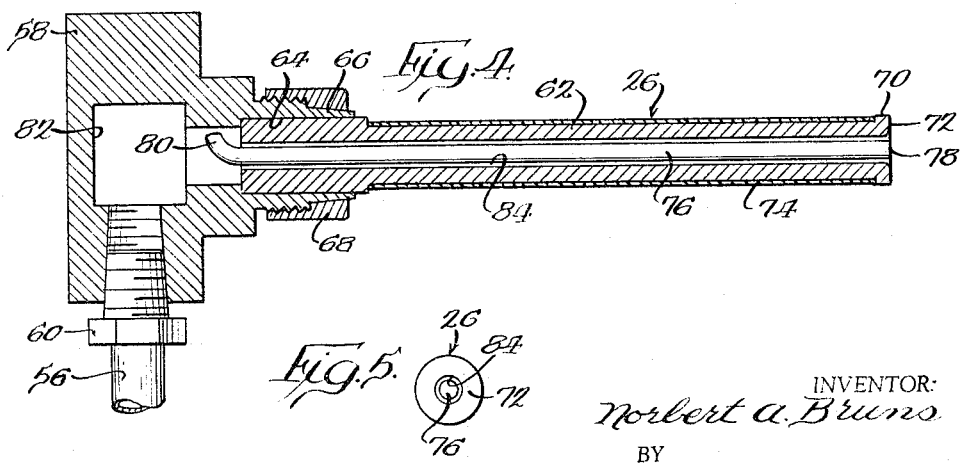
Fig. 4.
Fig. 5.
INVENTOR:
Norbert A. Bruns
BY
Wupper, Gradolph & Love
attys

United States Patent Office 3,288,698
Patented Nov. 29, 1966

3,288,698
ELECTRODE FOR ELECTROLYTIC CAVITY SINKING
Norbert A. Bruns, Palatine, Ill., assignor to Anocut Engineering Company, Chicago, Ill., a corporation of Illinois
Filed Sept. 13, 1962, Ser. No. 223,508
9 Claims. (Cl. 204—224)

The present invention relates to the art of electrolytically removing material from an electrically conductive and electrochemically erodable workpiece. In particular, it relates to an improved electrode for forming or sinking substantially flat bottomed cavities or through holes in such workpieces.

The electrode of this invention is useful in using the apparatus and methods disclosed in the copending applications of Lynn A. Williams, Serial No. 772,960, now Patent 3,058,895 filed November 10, 1958, entitled "Electrolytic Shaping," and Serial No. 73,154, now Patent 3,002,969 filed September 2, 1960, entitled "Electrolytic Cavity Sinking Apparatus and Method," and the application of Lynn A. Williams and Leonard Malkowski, Serial No. 201,679, filed June 11, 1962, entitled "Electrolytic Shaping and Cavity Sinking Apparatus," and assigned to the assignee of this application.

In these prior applications there are disclosed various machines and methods for forming or sinking a cavity in or through a workpiece by advancing an electrode having one or more electrolyte feed passages therethrough and a workpiece relatively toward each other while simultaneously pumping an electrolyte through the electrolyte feed passages and the work gap defined between the electrode working face and the workpiece at a high pressure in the order of from 30 or 40 to 350 p.s.i and passing a low voltage (4 to 24 volts) high density (100 to 8000 amperes per square inch) direct current between the electrode working face and the workpiece in a sense to make the workpiece anodic.

These prior applications disclose various types of electrodes for forming cavities in or holes through workpieces including tubular electrodes which may have both their external and internal walls insulated; bundles of spaced tubes mounted in a header with the tube bores providing feed passages and the spaces between the tubes providing exit passages for the electrode; blocks and similar elements drilled and shaped to provide electrolyte inlet and sometimes exit passages. The multiple inlet passage arrangement is also disclosed in Lynn A. Williams Patent Nos. 3,019,178, dated January 30, 1962, entitled "Electrode for Electrolytic Shaping," and 3,041,265, dated June 26, 1962, entitled "Electrode for Electrolytic Hole Sinking," and Lynn A. Williams patent applications, Serial No. 844,706, filed October 6, 1959, entitled "Electrolytic Removal of Work Materials," Serial No. 35,646, now Patent 3,123,545 filed June 13, 1960, entitled "Electrode for Electrolytic Hole Sinking," and Serial No. 36,314, now Patent 3,235,475 filed June 15, 1960, entitled "Electrolytic Shaping Apparatus and Method," and assigned to the assignee of this application. Many of the electrodes of the above applications left a waffle-like pattern on the bottom of the cavity, which was particularly pronounced if the feed passages were appreciably spaced in the lateral direction and interspersed with exit passages. This pattern could be minimized, and perhaps obliterated, by relatively transversely agitating the electrode and the workpiece as disclosed in application Serial No. 36,314, now Patent 3,235,475. However, this is not always feasible, and especially so when a relatively deep straight sided cavity is being formed.

In sinking cavities with a tubular electrode having a single relatively large, in a transverse sense, feed passage therethrough, an upstanding projection will remain on the bottom of the cavity. This projection will be generally conical if the interior of the electrode is not insulated, and will be cylindrical or shaped complementally to the shape of the electrode bore if the feed passage is internally insulated.

When electrolytically machining a hole through a workpiece by means of the tubular electrode, the upstanding cylindrical or conical slug at the exit side of the workpiece frequently toppled against the inner walls of the electrode, which resulted in damage to the electrode. Since the electrolytic machining equipment is usually provided with an automatic shutoff control actuated upon detection of the shorting condition in the electric circuit, the electrolyzing operation immediately terminates and must be restarted after the shorting condition has been rectified. This results in loss of operational time and sometimes results in an unsatisfactory workpiece, since the point of electrode movement stopping and starting may be noticeable. This problem is extremely annoying when a through hole is to be formed in a stack of sheets. Small wafers of the material become loose in the electrode bore and must continually be removed to prevent shorting.

It is therefore a principal object of the present invention to provide a new and improved electrode of the tubular type for use in electrolytic shaping apparatus, which prevents the formation of cylindrical or conical slugs upstanding from the base of a cavity or hole being electrolytically machined.

Another principal object is to provide an electrolytic shaping apparatus incorporating a new and improved electrode for the production of smooth bottomed cavities.

Another object is to provide a new and improved electrode for electrolytic cavity sinking, wherein the feed passage is equipped with means to form a substantially smooth bottom in the cavity.

Another object is to provide a new and improved tubular cavity sinking electrode, wherein the feed passage is provided with means to eliminate protuberances and irregularities on the bottom of the cavity.

Other objects and advantages will become apparent from the following description taken in conjunction with the accompanying drawings, wherein FIG. 1 is a schematic view of a portion of an electrolytic shaping and cavity sinking apparatus arranged to use the electrode of the present invention;

FIG. 2 is a medial longitudinal sectional view, on an enlarged scale, of the electrode of FIG. 1, which is constructed in accordance with the present invention;

FIG. 3 is an end view of the working tip of the electrode of FIG. 2;

FIGS. 4 and 5 are sectional and end views, respectively, of another electrode constructed in accordance with the present invention;

Figure 6:
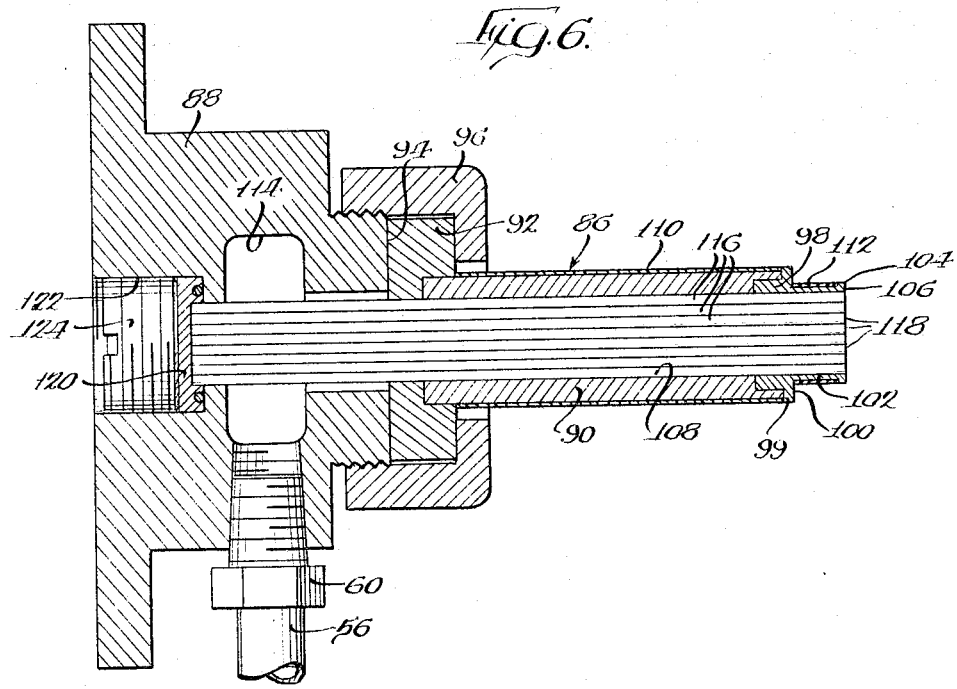
FIG. 6 is a medial longitudinal view of still another electrode of larger diameter than those of FIGS. 2 to 5, constructed in accordance with the present invention.

FIG. 1 in the drawings illustrates schematically an electrolytic apparatus 20 which may be generally of the type shown in the copending applications of Lynn A. Williams, Serial No. 73,154, now Patent 3,002,969 filed September 2, 1960, entitled "Electrolytic Cavity Sinking Apparatus and Method," and Lynn A. Williams and Leonard Malkowski, Serial No. 201,679, filed June 11, 1962, entitled "Electrolytic Shaping and Cavity Sinking Apparatus."

The apparatus includes a movable ram 22 having a ram head 24 thereon, adapted to support an electrode 26. A workpiece W is held in a chuck 28 mounted on a shaft 30 which is supported in a bearing structure 32, which is insulated from the body of the machine. The shaft 30 is driven from an electric motor 34 through a belt 36 and driving and driven pulleys 38 and 40, respectively.

Direct current electric power is supplied from a source 42 through a line 44 connecting the negative terminal of the source to a conductive mounting plate 46 for the electrode, and through a line 48 connecting the positive terminal of the power source to a brush and commutator structure 50 for the shaft 30 which is electrically connected to the chuck 28 and the workpiece W, as more fully disclosed in the aforementioned applications.

The electrolyte is supplied to the electrode from a tank 52 by a pump 54, through a conduit and hose system 56 connected to a header or manifold 58 by a fitting 60. The electrolyte is under superatmospheric pressure, as indicated above, and the supply system includes filters, valves, gauges, and the like which are not important to this invention.

As seen in FIG. 2, the electrode 26 comprises a relatively long tube 62 having its inlet end fitted into a seat 64 in the manifold 58. The seat is formed by a hollow extension of the manifold which is provided with a split frustoconical portion 66 to be engaged with a complementally shaped portion of a hollow nut 68 in order to anchor the electrode tube securely in place.

At its outer or working end the tube 64 is formed with a lateral flange 70 which permits of a small amount of side erosion of the cavity as it is being formed, together with a working face 72 which is exposed to the bottom of the cavity.

It will be noted that between its flange 70 and inlet end, the tube 62 is recessed slighlty to accommodate an external insulating layer 74 of a few thousandths of an inch of an epoxy resin or the like to insulate the body of the tube 62 from the side walls of the cavity, thereby to limit the extent of the lateral erosion of the cavity wall.

As explained in the above mentioned patent applications, during cavity sinking operation the cavity is formed a few thousandths of an inch larger in size than the external dimensions of the electrode in order to accommodate either the exit flow of electrolyte or the feed flow of the electrolyte, depending on whether the initial feed is through the bore of the electrode or the exit is through the bore of the electrode. The longitudinal length of the exposed portion of the flange 70 is determined by the amount of later erosion to be accommodated, and also by the infeed rate of the electrode into the work under the impetus of the ram 22.

It will be noted from FIG. 2 that the inner surface of the electrode tube 62 is not insulated, and that the electrode is fitted with a pluraliy (in this case three) of solid elements, rods, or wires 76. These wires have their outer tips or faces 78 coplanar or flush with the face 72 of the electrode tube, and their inner ends hooked at 80 and engaged in chamber 82 in the manifold 58. It should be observed from FIG. 3 that the wires 76 snugly fit the bore 84 of the tube 62, but obviously do not fill it to capacity, thereby providing in the spaces among the wires 76 and the tube bore 84, sufficient space for the flow of electrolyte, in this case, from the manifold 58 to the work gap between the working face 72 and the bottom of the cavity in the workpiece W.

In a typical example, the exterior diameter of the electrode measured across the working face 72, is .150" and the diameter of the bore 84 is about .070". The diameter of the three wires 76 is .040" and they will, as seen in FIG. 3, contact each other and the interior wall of the bore 84, thus insuring that the wires 76 are brought into the electrolytic circuit as part of the cathodic structure of the electrode 26.

Electrodes having diameters greater than .150" have been operated satisfactorily, but the size of the electrode cannot be expanded indefinitely without making provision to assure an adequate flow of electrolyte in the mid-area portion of the frontal surface of the electrode. Accordingly, in the preferred embodiment of the invention the bore of the electrode will not be substantially greater than about ½" to ¾". This is applicable to a cylindrical electrode. Where the shape is other than cylindrical, then at least one of the dimensions will preferably be held within this limit. For example, if the electrode is rectilinear it may have a length of several inches substantially without limit, but its interior width should not exceed the dimensions indicated above if one is to obtain optimum results.

In the environment of FIG. 1, the workpiece W is held in the chuck 28 and rotated by the motor 34 through the shaft 30. As the electrode 26 is advanced toward and into the work, the electrolyte supply is turned on by turning on the motor for the pump 54 and the power supply 42, thereby providing a flow of electrolyte and a flow of current at the same time. Since the workpiece W is rotating, it is readily appreciated that a smooth bottom will be formed in the cavity in the workpiece W. Should it be desired that the electrode pass completely through the workpiece W, thereby forming a through hole, there will be no remaining slug, either conical or cylindrical, to fall back against the electrode upon breakthrough at the remote or exit side of the workpiece, which eliminates short circuiting, damage to the workpiece, and damage to the electrode itself.

FIGS. 4 and 5 show a variation of the electrode structure of FIGS. 2 and 3, the electrode being slightly smaller in size, having a diameter across the working face 72 of the electrode of .120" and an electrolyte bore 84 of .060". The copper wire is .040", and is hung in the bore 84 in such fashion as to contact the electrode tube 62 at the inlet end thereof and to be engageable with the bore during the electrolytic shaping operation in order to provide conductivity between the electrode tube 62 and its mount and the wire 76 in order to insure that the latter is conductive at its working tip 78, thereby to form a substantially flat bottom on the cavity being sunk in the workpiece W.

It will be observed that in using this electrode, it would not be necessary to rotate the workpiece W, as there is very little space at the working end of the electrode which is not accommodated or filled by the tip 78 of the wire 76 or the face 72 of the electrode tube 62. As a matter of fact, it is not essential that the workpiece be rotated when using the electrode of FIGS. 2 and 3. However, somewhat better results are obtained when the workpiece is rotated.

Furthermore, it may be desirable to hold the workpiece stationary, particularly when the cavity is being formed off center of the workpiece, and to rotate the electrode itself in the manner shown in the aforementioned application of Lynn A. Williams, Serial No. 772,960, now Patent 3,058,895 FIG. 14.

Figure 7:
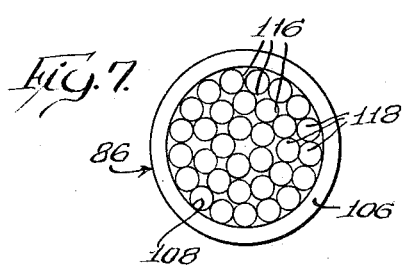
FIG. 7 is an enlarged end view of the working tip of the electrode of FIG. 6.

FIGS. 6 and 7 disclose another electrode embodying the present invention, indicated generally by the reference 86, and secured to a manifold 88 which is adapted to be mounted on the ram head 24. The electrode includes a tube 90 which has its inlet end secured to a brass ring 92 which is held against a face 94 on the manifold 88 by a hollow retaining ring 96. The tube 90 is fitted at its outer end with a tip element 98 arranged and constructed for forming a two diameter cavity in the workpiece. The element 98 is secured to the copper tube 90 by brazing or silver soldering and has a first working face 100 of ring-like configuration outstanding from an extension 102 of the tip which terminates in a flange 104 providing a working face 106. The outer diameter of the flange 104 is the same as the inner diameter of the annular working face 100, while the inner diameter of the working face 106 is the same diameter as the bore 108 of the tube 90 and tip 98. Between the ring 92 and the flange 99 providing the working face 100, the outer diameter of the tube 90 is coated with an insulating layer of epoxy resin 110 and a similar insulating layer 112 of resin covers the extension 102 of the tip 98.

The manifold 88 is formed with a cavity 114 through which the electrolyte is adapted to be pumped into the bore 108 of the electrode 86.

The bore 108 of the electrode 86 is filled with a plurality of copper tubes, rods, wires, or the like 116 which have their outer ends 118 co-terminous and flush with the working face 106 of the electrode. At their inner ends the tubes are brazed or silver soldered to a mounting ring 120 which is held in a recess 122 in the back of the manifold 88 and opposite the manifold cavity 114. The ring is secured in position and held against dislodgement by a retaining screw 124.

In fabricating the electrode, the tubes, rods, wires, 116, or the like, are brazed to the ring 120 and after the manifold 88, electrode tube 90, and elements 116 have been assembled, the tube, rod, or wire ends will project beyond the face 106 of the electrode 86. When thus assembled, these projecting ends are cut off to be flush with the electrode, thereby assuring that the electrode working face 106 and the faces 118 are coplanar to provide the flat bottom in the cavity.

This electrode may be used in an environment where the electrode and the workpiece are relatively rotated either by rotating the electrode or by rotating the workpiece, or where they are stationary and the electrode and workpiece are advanced relatively toward each other so that a stepped or dual bore cavity may be formed in the workpiece, one cavity being formed by the working face 100, and the other by the working face 106 and bottomed by the wire, rod, or tube faces 118. The functioning of this electrode is the same as that of the preceding embodiments, and need not be repeated.

From the foregoing description it will be apparent that the objectives which were claimed for this invention at the outset of this specification have been attained.

While preferred embodiments of the present invention have been shown and described, it will be apparent that numerous variations and modifications may be made therein without departing from the underlying principles of this invention. It is therefore desired, by the following claims to include within the scope of the invention all such modifications and variations by which substantially the results of this invention may be obtained through the use of substantially the same or equivalent means.

What is claimed as new and desired to be secured by United States Letters Patent is:

1. In an apparatus for electrolytically machining a cavity in an electrically conductive and electrochemically erodible workpiece including means for holding the workpiece, an electrode tool for said machining, means for moving the tool and the workpiece relatively toward each other and for maintaining a work gap therebetween, means for circulating an electrolyte through the work gap, and a source of direct current electricity connected to the electrode tool and the workpiece whereby the workpiece and the electrode tool function as an anode and a cathode respectively, the improvement wherein said electrode tool comprises an elongate electrically conductive tube having a working face at its outer end through which the electrolyte is pumped for circulation to and through the work gap, and at least one electrically conductive solid cylindrical element of substantially uniform cross section electrically connected to said tube, extending the length thereof, and having a cross sectional area of at least about 50 percent of the cross sectional area of the bore of said tube, said element having an end coplanar with said working face.

2. The combination set forth in claim 1, wherein said electrically conductive means comprises at least one electrically conductive rod.

3. The combination set forth in claim 2, wherein said rod has a hooked inner end engageable with the inner end of said tube to prevent movement of said rod longitudinally of said tube.

4. In an apparatus for electrolytically machining a cavity in an electrically conductive and electrochemically erodible workpiece including means for holding the workpiece, an electrode tool for said machining, means for moving the tool and the workpiece relatively toward each other and for maintaining a work gap therebetween, means for circulating an electrolyte through the work gap, and a source of direct current electricity connected to the electrode tool and the workpiece whereby the workpiece and the electrode tool function as an anode and a cathode respectively, the improvement wherein said electrode tool comprises an elongate electrically conductive tube having a working face at its outer end and through which the electrolyte is pumped for circulation to and through the work gap, structure forming a hollow manifold connected to and supporting said tube at its inner end and through which the electrolyte is pumped to said tube, and electrically conductive solid cylindrical elements of substantially uniform cross section electrically connected to said tube, extending the length thereof, and having a total cross sectional area of at least about 50 percent of the cross sectional area of said tube, said elements having outer ends coplanar with said working face.

5. The combination set forth in claim 4, wherein said electrically conductive elements comprise a plurality of rods which are electrically connected together with said tube.

6. The combination set forth in claim 5, wherein said rods have hooked inner ends engageable with the inner end of said tube to prevent movement of said rods longitudinally of the tube.

7. The combination set forth in claim 4, wherein said electrically conductive elements comprise a plurality of wires having hooked inner ends to prevent them from moving longitudinally of said tube.

8. The combination set forth in claim 4, wherein the inner ends of said electrically conductive elements are secured to a plate, and means are provided for mounting said plate in said manifold.

9. The combination set forth in claim 8, wherein said elements comprise a pluraltiy of wires having their inner ends secured to said plate, and said manifold is formed with a recess opposite the inner end of said tube and in which said plate is mounted so that said wires extend through said manifold and into said tube.

References Cited by the Examiner

UNITED STATES PATENTS

| 2,909,641 | 10/1959 | Kucyn | 219—69 |
| 3,019,178 | 1/1962 | Williams | 204—143 |
| 3,041,265 | 6/1962 | Williams | 204—284 |
| 3,058,895 | 10/1962 | Williams | 204—143 |
| 3,123,545 | 3/1964 | Williams | 204—224 |

FOREIGN PATENTS

| 335,003 | 9/1930 | Great Britain. |

JOHN H. MACK, *Primary Examiner.*

R. K. MIHALEK, *Assistant Examiner.*